United States Patent Office 3,081,102
Patented Mar. 12, 1963

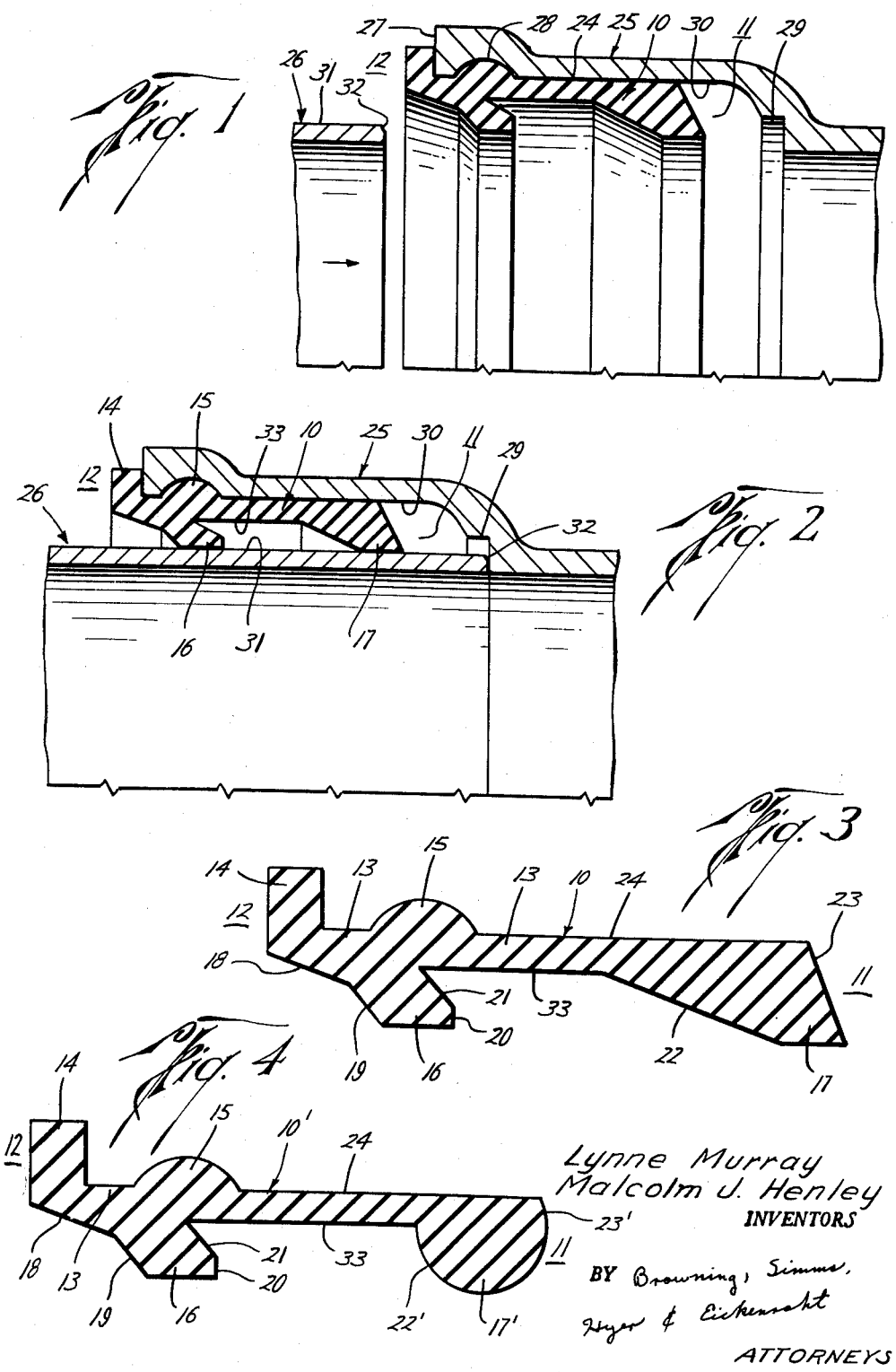

3,081,102
GASKET FOR TELESCOPING JOINT
Lynne Murray, Houston, and Malcolm J. Henley, Tyler, Tex., assignors to Murray Rubber Company, Inc., and Tyler Pipe and Foundry Company, both corporations of Texas
Filed Oct. 3, 1960, Ser. No. 60,182
2 Claims. (Cl. 277—168)

This invention relates to a novel gasket and its use in forming a fluid-tight seal between telescoping members. More specifically, it relates to a novel annular resilient gasket and its use in forming a fluid-tight seal between telescoping members of cast iron soil pipe of the bell and plain spigot type.

A problem exists in forming a fluid-tight seal between telescoping members, especially where such joint is subject to pulsating fluid pressures, displacement of the members of such joint from their original alignment and the effects created by the strains of expansion, contraction and vibration exerted on such joint.

For example, such problem is especially noted where lengths of cast iron soil pipe of the bell and spigot type must be joined. Cast iron pipe is extensively used for water, gas, sewage, culverts, drains, etc., in a wide range of sizes and for varying pressures, and is particularly adapted to underground and submerged service because of its comparatively high corrosion-resistent qualities. This pipe is generally used for underground sanitary sewers, and, therefore, having a fluid-tight joint is an absolute requirement. The bell and spigot type of cast iron pipe is more difficult to join in a fluid-tight seal than a flange end and gasket joint, but it is preferred as it possesses greater flexibility than the flange joint and provides for some expansion and contraction. It is these characteristics of the bell and spigot type pipe that make it especially suited for underground pipe lines and therefore it is almost exclusively used for that purpose. The most common type of seal that is fluid-tight and meets the required standards of such joints is that which is calked and leaded.

In this type of seal an annular ring of packing material, such as oakum, is forced into the cavity between the outer surface of the spigot and the inner surface of the bell after they are telescoped together. The fluid seal is completed by pouring and calking lead behind the oakum and in such an amount that the lead fills the cavity up to and including a packing groove that is formed in the interior surface of the bell. The calked and leaded type seal is somewhat flexible but not to a great degree, and will leak if the telescoped pipe members are substantially displaced from their original alignment. Although it appears that this type of joint meets most of the requirements of a satisfactory seal, it does have certain disadvantages. These disadvantages include the following: skilled labor is required to properly prepare the joint and the joint tends to leak where the joint is subject to vibrations and heavy load conditions such as created where the pipe is underground beneath streets having heavy surface traffic. When such leaks occur, the pipe must be uncovered and the joint resealed, usually by recalking.

Cement and bituminous adhesive type sealing materials have been used to form the seal as a substitute for the leaded and calked seal. However, these materials are not as satisfactory as a calked and leaded seal, and most municipal authorities will not approve their use.

Many gaskets of annular resilient sealing elements or gaskets have been proposed that would solve the stated problem and provide an adequate fluid-tight seal for the joint between telescoped members. Generally, these seals have suffered from one or more deficiencies, and, therefore, have not supplanted the calked and leaded type seal. This is especially true for the gaskets for bell and plain spigot type of cast iron soil pipe presently used in the United States.

Among the many deficiences existing among these seals, the following listing encompasses those most significant to the problem of providing an adequate fluid-tight seal for sealing joints between telescoping members: (a) the seals are difficult to install and are likely to be damaged during installation, (b) they cost more than the usual leaded and calked seal where the seal requires a specially designed spigot and bell structure or if these telescoping members have to be constructed to more exacting dimensional tolerances, (c) they are displaced from their sealing position when subject to the effects of pulsating pressure, (d) they provide no advantages as to the quality of the fluid-tight seal of a joint, although costing more than the usual leaded and calked seal, and (e) they are not equal in their sealing functions to that of the leaded and calked seal so that they would be accepted for use in accordance with the building codes established by municipal authorities.

The type of seal that would be preferred is one having the accepted fluid-tight sealing qualities of the leaded and calked type seal but that is easily installed by unskilled labor, and that can maintain its sealing qualities whenever the sealed joint is subject to the various conditions which heretofore have caused the leaded and calked joint to leak.

It is therefore an object of the present invention to provide a novel gasket that is easily installed by unskilled labor to form a fluid-tight seal between telescoping members.

Another object is to provide a novel gasket that forms a fluid-tight seal between telescoping members where the dimensions of such members may vary.

A further object is to provide a novel gasket that is easily installed and forms a fluid-tight seal between the telescoped members of cast iron soil pipe of the bell and plain spigot type.

Yet another object is to provide a novel gasket that forms a fluid-tight seal in the joint between lengths of cast iron soil pipe even though such lengths may not be in alignment.

Another object is to provide a novel gasket for sealing the joint between lengths of cast iron soil pipe where such pipe may be displaced from its original alignment after the seal is formed.

A different object is to provide a novel gasket that provides a fluid-tight seal between lengths of cast iron soil pipe and also resists separation of such pipe while the pipe is conducting fluid under pressure.

A still further object is to provide a novel gasket for cast iron soil pipes that is accepted by municipal authorities.

Another object is to provide a novel gasket for cast iron soil pipe that is not displaced from its fluid-tight sealing position by the pulsations of fluids under pressure that are being conducted in such pipe.

Another different object is to provide a novel gasket that is easily installed to form a fluid-tight seal in cast iron soil pipe of the bell and plain spigot type that is not damaged during assembly or disassembly of such joint.

A further object is to provide a novel gasket that has no tendency to be displaced from its proper sealing relationship to the pipe joint as such joint is assembled or disassembled.

Still a different object is to provide a novel gasket that requires no auxiliary holding devices to retain it in position during assembly, disassembly of the joint, or while forming a fluid-tight seal in such joint.

Another object is to provide a joint between telescoping members utilizing a resilient gasket in a novel manner that does not leak, resists separation of the members due to fluid pressure acting upon it, and that may be readily assembled and disassembled by unskilled labor.

A still further object is to provide a joint between telescoping members that utilizes a resilient gasket in a novel manner that can maintain a fluid-tight seal under conditions which have heretofore caused prior joints to leak.

Yet another object is to provide a joint between telescoping members that utilizes an annular rubber gasket to form a fluid-tight seal therebetween and that has sealing qualities that supplant those of the calked and leaded sealed joint, and that is accepted by municipal authorities for use in place of the calked and leaded sealed joint.

These and other objects will become more apparent when read in conjunction with the following detailed description and the attached drawings of a preferred illustrated embodiment of the present invention, wherein:

FIG. 1 is a partial sectional view showing one form of gasket in accordance with this invention positioned within the bell end of one telescoping member and before the spigot end of a second telescoping member is inserted therein;

FIG. 2 is a partial sectional view showing the completed joint;

FIG. 3 is a sectional view through one side only of the gasket illustrated in FIG. 1; and FIG. 4 is a view similar to FIG. 3 showing another embodiment of a gasket constructed in accordance with the present invention.

The objects of the present invention are achieved by the gaskets and the joints as specifically illustrated in the drawings and described hereafter in which the annular resilient gasket is comprised of a sleeve having a flange on its downstream end and an outwardly extending projection adjacent the flange. A spigot centering member is provided and extends inwardly from the sleeve adjacent the projection and is inclined toward the axis of the sleeve and its upstream end. An annular nosing is formed on the upstream end of the sleeve and this nosing extends inwardly and circumferentially about the sleeve. The function of these various portions of the gasket will be described more fully hereafter.

The gaskets of the present invention may be used to form fluid-tight seals in the joints between telescoping members wherein one of such members is enlarged to receive a second of such members and a space exists between such members wherein the gasket may reside. Such a joint will be broadly termed a "bell and spigot" joint.

For the purpose of describing the present invention, the telescoping members will be illustrated and described as the bell and spigot ends of cast iron soil pipe. The male end of a section of pipe which enters the enlarged portion of an adjacent section of pipe is known as the spigot and the enlarged portion which receives the spigot is known as the bell.

More particularly, the description will be of one particular type of bell and spigot cast iron pipe that is commercially produced in the United States. This type of pipe is the bell and plain spigot pipe in which the spigot has a straight shoulder, i.e., there is no calking or packing bead about the outer periphery of the end of the spigot.

However, the gasket may be readily adapted to seal other types of joints than that specially described, as will be apparent to one skilled in the art.

Reference is now had to FIG. 3 of the drawings, wherein for the purpose of illustration there is shown a preferred embodiment of the present invention. The gasket as specifically illustrated is indicated generally by the numeral 10 and is made from a resilient material such as rubber, preferably a natural or synthetic rubber, such as, for example, neoprene. Gasket 10 has an upstream end 11 and a downstream end 12 herein designated for the purpose of convenience of description, it being understood that the upstream end 11 refers to the end of the gasket subject to a greater fluid pressure than the downstream end, usually the pressure from within the pipe joint. The downstream end 12 is remote from upstream end 11. Generally, the downstream end 12 will not be subject to any fluid pressure except for that existing in the area surrounding the pipe joint externally thereof. It is envisioned that the various operable parts of the gasket may be reversed from the arrangement shown in the illustrative embodiment, and that further adaptation of such parts may be made where the gasket is used to seal pipe which is used to conduct fluids under reduced pressures.

The gasket 10 is most aptly described as an annular resilient member and has a cylindrical part or a sleeve 13 which forms its basic portion. The sleeve 13 has formed thereon an outwardly extending flange 14 adjacent its downstream end 12. The flange 14 is adapted to engage the front face of the bell of a cast iron pipe when the gasket 10 is inserted therein and serves to retain the gasket in position during assembly of the joint. The flange may take the form substantially as it is shown in FIG. 1 or it may have other forms that are adapted to secure the gasket 10 in the bell end of the cast iron pipe as the spigot of the adjacent pipe is inserted therein to form the joint.

The gasket 10 is provided with a means to hold it in position within the bell and in the illustrated embodiment this means takes the form of a projection 15, which is formed on the outer surface 24 of sleeve 13 adjacent flange 14 and extends outwardly therefrom. The projection 15 may take the form of a bead as is shown in the illustrated embodiment of FIG. 3, or it may have other forms, the only limitation being that the projection will engage the packing groove formed in the interior surface of the bell end of a cast iron pipe when the gasket 10 is inserted therein. This projection 15 serves to hold the gasket 10 in its sealing position within a pipe joint so that the gasket is not displaced by pulsations in the fluid pressure that may be applied to the upstream end 11 of gasket 10. It also holds the gasket 10 in the bell when the pipe joint is disassembled and thus there is no danger of the gasket falling from the bell upon disassembly of the joint and being lost.

The gasket 10 is provided with a means in the form of centering member 16 to center a spigot within it. Centering member 16 extends circumferentially inwardly from sleeve 13 adjacent the projection 15 and is inclined toward the axis of the sleeve and its upstream end 11. Centering member 16 may extend inwardly for such a distance as required for it to engage the external surface of a spigot that may be positioned within the gasket 10 if a seal is desired between member 16 and the spigot. Thus, centering member 16 can perform a dual function. It can serve to center the spigot within the bell of the joint as the spigot is inserted therein and also can provide a fluid seal between such spigot and gasket 10 when the member 16 extends inwardly a sufficient distance to engage the spigot.

A means is provided on the gasket 10 whereby a spigot inserted into the gasket positioned in a bell will be aligned with the aligning groove in such bell and will also form a fluid-tight seal between the spigot and bell. This means may take the form of nosing 17.

Annular nosing 17 is formed on the upstream end 11 of the sleeve 13 and extends inwardly circumferentially about such sleeve. The nosing 17 extends inwardly for such distance as is required for it to engage the external surface of a spigot that may be positioned within the gasket 10. Thus, nosing 17 serves as a fluid-tight seal between the bell and the spigot of the telescoped members of a joint when the innermost extremity of nosing 17 engages the exterior surface of the spigot and also centers the spigot with the aligning groove of the bell.

The nosing 17 should engage the spigot to the extent required to form and maintain a fluid-tight seal when the telescoped members are coaxially aligned, when misaligned to the maximum extent of misalignment permitted by the structure of the bell and spigot and also when the joint members are displaced from their original alignment.

The gasket 10 is provided with means to facilitate entry of a spigot into a bell which has the gasket 10 mounted therein without damage to the gasket, to guide the spigot to within the centering member 16, and additionally to guide the spigot to within centering 17 so as to insure that the spigot will seat in the aligning recess formed in the bell. These means take the form of various inwardly tapering surfaces to be hereafter described. The gasket 10 is provided with an anular inwardly tapering surface 18 and a second annular inwardly tapering surface 19 connected to surface 18 but inclined at a greater angle relative to the axis of the said sleeve than the first mentioned surface 19. It will be readily appreciated that surface 18 assists in centering the spigot of a pipe within the opening in gasket 10 that extends beyond the front face of the bell end of such joint and prevents injury to the gasket during such operations. The surface 19 assists in guiding the spigot during further insertion into the gasket so that centering member 16 may position or center it within the opening through the gasket 10. The centering member 16 may be provided with an undercut surface 21 to give it more flexibility so that it can be displaced as the spigot is being passed through the gasket 10 and thereby prevent damage to gasket 10 at the extremity of center member 16 in its contact with the spigot. The undercut surface 21 is interrupted near the extremity of centering member 16 by a substantially radially extending surface 20 so that the spigot may be withdrawn from the gasket without the centering member 16 having a tendency to roll over and be torn during disassembly of the joint.

The means to guide the spigot during the final stages of its insertion into the gasket 10 so that the spigot will be aligned within the nosing 17 is provided by annular inwardly tapering surface 22. Surface 22 functions similarly to surface 19.

The outer surface 24 of gasket 10 may be formed substantially complementary to the inner surface of the bell so as to reside closely adjacent thereto when the gasket is installed therein and preferably to engage it. The upstream end 11 of gasket 10 is preferably provided with an inclined surface 23 so that the tendency of the gasket 10 to be damaged as it is installed into the bell of a pipe is greatly reduced and to provide nosing 17 with some flexibility in the same manner as undercut surface 21 does for member 16.

It is to be understood that for the purpose of description the gasket 10 has been considered as being comprised of portions or parts such as sleeve 13, etc., but that in reality these portions will be integrated in structure and function into a unitary device.

Having described one embodiment of the present invention, gasket 10, as specifically illustrated in FIG. 3, a detailed description of the use of such gasket in forming a fluid-tight seal between telescoping members will be given. Referring to FIG. 1, there is shown a bell 25 of a well known type of cast iron soil pipe produced commercially in the United States. Also shown is a complementary telescoping member of the same type of pipe, a plain spigot 26. By plain spigot is meant one having a straight shoulder as contrasted to the type of spigot having a calking shoulder or bead about the outer periphery of the end of the spigot.

The bell 25 has a front face 27 of the usual form and a packing retaining groove 28 which is arcuate in cross-section. An aligning groove 29 is provided into which the forwardly facing shoulder 32 of spigot 26 may be seated. The gasket 10 is inserted into bell 25 until flange 14 engages front face 27 and projection 15 engages the packing groove 28 of the bell 25. It is noted that generally the interior surface 30 of bell 25 is rough and may also have sharp projections, and, therefore, the inclined or tapered surface 23 of the downstream end 11 of gasket 10 greatly facilitates its installation into the bell end 25 without damage to the gasket. The gasket may be lubricated to facilitate its insertion into the bell.

The exterior surface 24 of gasket 10 resides closely adjacent the interior surface 30 of the bell and preferably engages same throughout its length. After the gasket 10 is positioned within bell 25, the spigot end 26 may be inserted therein. The interior surfaces of gasket 10 that are to engage spigot 26 are preferably lubricated to facilitate the insertion of spigot 26 into the gasket. The spigot 26 is positioned generally in alignment with the opening through gasket 10 and moved in a direction to effect telescoping of the bell and spigot. If the spigot and bell are not exactly centered in alignment, the surface 18 will guide the spigot upon its movement into the gasket and prevent damage to the downstream end 12 of the gasket. The spigot 26 as it is moved further into gasket 10 will encounter surface 19 and slides therealong to be centered within centering member 16. It is an important feature of the present invention that should the force exerted against surface 19 by the forward shoulder 32 of spigot 26 approach that which may damage sealing member 16, the member 16 will be deflected to allow the spigot to pass. When such deflecting forces are relieved, member 16 returns to its original position. After spigot 26 passes through fluid-sealing member 16 into gasket 10, it is substantially centered within bell 25. Further insertion of spigot 26 will cause it to engage surface 22 on nosing 17 and thereby be guided within nosing 17 and thus be in exact alignment with the aligning recess 29 in bell 25. The nosing 17 can be deflected in the same manner as centering member 16 to prevent its being damaged by the insertion of spigot 26. Spigot 26 is inserted until its forward facing shoulder 32 engages aligning recess 29. The fluid-tight seal in the joint between bell 25 and spigot 26 is completed.

Referring to FIG. 3, the sealing action of the gasket 10 will be described. The exact mechanics by which the fluid-tight seal is obtained with the novel gasket of the present invention need not be limited to a single type of sealing action. The sealing action may be a compression type seal, a fluid-actuated seal or a combination of both types of seals. Whatever the method of sealing, the seal is accomplished at the upstream end 11 of gasket 10 due to engagement of nosing 17 with the exterior surface 31 of spigot 26 and engagement of the outer surface 24 of gasket 10 with the inner surface 30 of bell 25. Preferably, an additional seal is formed when the centering member 16 engages the exterior surface 31 of spigot 26 and the exterior surface 30 of gasket 10 adjacent projection 15 engages the interior surface 30 of bell end 25. Should fluid pressure be applied to surface 21 and surface 33 adjacent centering member 16, a fluid-actuated sealing action can result. Thus, a fluid-tight seal is accomplished, whether by compression type seals, fluid-actuated seals or a combination of both, either by nosing 17, centering member 16 or in both nosing 17 and member 16.

Additionally, the sealing action of gasket 10 results in the nosing 17 and the centering member 16 engaging the spigot 26 more tightly as the fluid pressure that is applied to the upstream end 11 of the gasket increases. This, of course, is another important feature of the present invention as it serves to prevent separation of the bell and spigot while the pipe is conducting fluid under pressure.

Additionally, the engagement of centering member 16, when it is disposed adjacent projection 15, with the exterior surface 31 of spigot 26 causes the projection 15 of gasket 10 to more tightly engage the packing groove 28 formed within bell 25. Thus, when the upstream end 11 of gasket 10 is subject to pulsating fluid pressure that would normally displace annular seal members of the types heretofore known, this pulsating fluid pressure will not displace the gasket 10 of the present invention but results in it being more securely held in sealing position. Due to the engagement of nosing 17 with the spigot 26 adjacent its forward extremity that resides in aligning recess 29, the joint members may be arranged in alignment or misalignment and also the members may be moved out of their original alignment without failure of gasket 10 to provide a fluid-tight seal.

It is an important feature of the gasket of the present invention that it can be used with telescoping members whose dimensions vary and yet form a fluid-tight seal therebetween. This advantage is primarily due to the structure of centering member 16 and nosing 17. These elements are flexible and can be displaced when sufficient forces are exerted against them by the spigot. Thus, whether these forces are due to misalignment of the members or due to dimensional variation of both is not critical, and the gasket is still able to provide a fluid-tight seal. The only factors to be considered are (1) whether member 16 or nosing 17, singly or in combination, can engage a spigot of a size which represents the smallest size of the dimensional variation in this member and still form a fluid-tight seal, and (2) if element member 16 and nosing 17 are sufficiently flexible to accommodate the largest size of spigot to be encountered.

Should it be desired to separate the joint, the spigot 26 is merely withdrawn from the joint and the gasket 10 may be reused or the joint may be reassembled with the removed spigot 26 or with some other telescoping member. The projection 15 prevents the gasket 10 from being displaced from the bell 25 as spigot 26 is being withdrawn during separation of the joint.

It has been found that a joint embodying the gasket of the present invention in joining bell and plain spigot type cast iron pipe, as specially disclosed, will remain secure against a pulsating fluid pressure.

A second embodiment of the present invention is shown in FIG. 4. The embodiment of gasket shown in FIG. 4 and generally designated by numeral 10' is substantially identical with that of FIG. 3 with the exception of the construction of the nosing portion. The gasket 10' is provided with a nosing 17' that is arcuate in a section taken along the axis of the sleeve and has a convex surface 22' facing such axis. An inclined surface 23' is provided at the upstream end 11 of gasket 10' to facilitate its installation into the bell end 25 of the pipe without damage to gasket 10'. The convex surface 22' provides the same function as surface 22 does in the other embodiment; that is, to guide the spigot to within nosing 17' and thereby exactly center the spigot 26 within bell 25 and within aligning recess 29. Otherwise, this embodiment functions in the same manner as that previously described.

It is envisioned that the telescoping members may take forms other than the tubular members specifically illustrated and described and in such instances the gaskets and joints of the present invention will provide all the advantages and accomplish all the objects of this invention will equal facility.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An annular resilient gasket for a telescoping tubular joint adapted to fit between inner and outer members of such joint to seal against leakage therebetween and provide two axially spaced circumferentially extending zones of centering tending at all times to axially align the inner and outer members of said joint, but resiliently yieldable through flow of the material of the gasket to permit limited misalignment when misaligning force exceeding that required to cause such flow of gasket material is applied to the joint; said gasket comprising, a flexible resilient integral sleeve having anchoring means adjacent one end of said sleeve including a circumferential bead adapted to engage a groove in one of the members of said joint and a radially projecting circumferential flange adapted to engage an end surface of such joint member to anchor the gasket against axial movement relative to such one member, said sleeve also comprising a circumferentially extending intermediate portion between said anchoring means and the opposite end of the sleeve providing a zone of a radial thickness less than the minimum clearance expected between the inner and outer members of said joint and of a diameter to freely receive the other joint member, and a centering member at each of the opposite ends of said intermediate portion, each comprising an axially extending zone of substantial width throughout which the material of the sleeve has an aggregate radial thickness normal to the axis exceeding the maximum expected clearance between the members of the joint within such zones, so that when such joint is assembled said centering members will provide spaced zones of radially continuous resilient material support in planes normal to such axis between the inner and outer joint members, at least one of said centering members being imperforate to provide a seal between the joint members and one of said centering members having a part in substantially radial alignment with the bead of said anchoring means, and, with said sleeve and bead, providing a radially continuous radial support and closure for bridging between the interior of such groove and the surface of said other member and thus center the joint members and maintain the bead within the groove, and is undercut part of the way from its ends closest to the other centering member, said sleeve having a tapered surface leading to each of said centering members from the direction of that end of the sleeve closest to the anchoring means to facilitate the engagement of said other joint member with the gasket.

2. A gasket in accordance with claim 1 in which the anchoring means is adapted to engage the outer joint member.

References Cited in the file of this patent

UNITED STATES PATENTS

| | | |
|---|---|---|
| 2,116,705 | Marx et al. | May 10, 1938 |
| 2,615,741 | Nathan | Oct. 28, 1952 |
| 2,887,328 | Risley et al. | May 19, 1959 |
| 2,980,449 | Dunton | Apr. 18, 1959 |
| 2,991,092 | MacKay | July 4, 1961 |